UNITED STATES PATENT OFFICE.

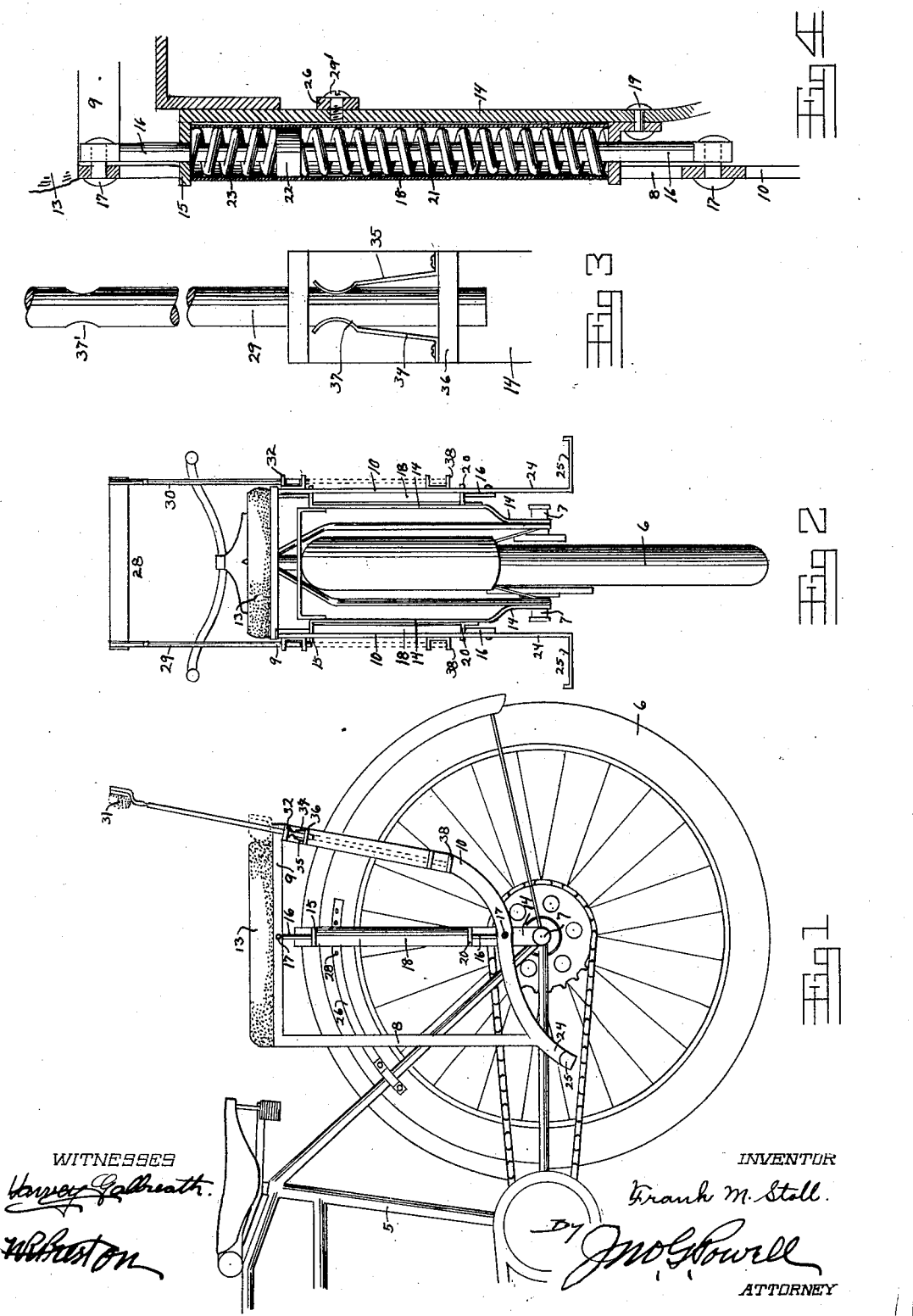

FRANK M. STOLL, OF DENVER, COLORADO, ASSIGNOR TO THE STOLL MANUFACTURING COMPANY, OF DENVER, COLORADO, A CORPORATION OF COLORADO.

COMBINED MOTOR-CYCLE REAR SEAT AND LUGGAGE-CARRIER.

1,093,741.  Specification of Letters Patent.  Patented Apr. 21, 1914.

Application filed May 7, 1912. Serial No. 695,677.

*To all whom it may concern:*

Be it known that I, FRANK M. STOLL, a citizen of the United States, residing in the city and county of Denver and State of Colorado, have invented new and useful Improvements in Combined Motor-Cycle Rear Seats and Luggage-Carriers; and I do declare the following to be a full, clear, and exact description of my invention, such as will enable others skilled in the art to which it appertains to make and use the same, reference being had to the accompanying drawing, and to the figures of reference marked thereon, which form a part of this specification.

My invention relates to a rear seat and luggage carrier for use with or application to a motor-cycle, and has for its object the provision of a device of this character adapted to relieve concussions and jars incident to the traveling of the motor-cycle over rough ground.

Another object of the invention is to provide a device of the class specified, which may be readily and effectively applied to any motor-cycle.

Another object of the invention is to provide a device of the class specified, constructed so that the back rest may be conveniently and readily placed in an operative or inoperative position and adjusted to the desired height.

Another object of the invention is to provide a device of this character, which is neat in appearance when applied to the motor-cycle.

Still another object of the invention is to provide a device of this class, which is inexpensive and simple in manufacture and effective in use.

With these and other objects in view, I will proceed to describe my invention with reference to the accompanying drawing.

In this drawing,—Figure 1 is a side elevation of the rear part of a motor-cycle, showing my improved combination seat and luggage carrier applied thereto. Fig. 2 is an end view of the motor-cycle and the combined seat and luggage carrier. Fig. 3 is a detail view showing the fastening device for holding the back in position. Fig. 4 is a longitudinal sectional view of the tube housing the spring which absorbs the concussions and jars.

The same reference characters indicate the same parts in all the views.

Let the numeral 5 designate the rear part of a motor-cycle frame and the numeral 6 the rear wheel thereof, journaled in the frame 5 by means of an axle 7.

My improved seat and luggage carrier is supported in position over the rear wheel of the motor-cycle and serves as an auxiliary or additional seat, which may be also used for carrying bundles or luggage. The same consists of two frames composed of members 8, 9 and 10, the said frames being arranged on opposite sides of the rear wheel 6 and connected by means of transverse bars. The members 9 of said frames support a seat 13, which may be composed of any suitable fiber or cushioning material.

I employ two uprights 14, one on each side of the rear wheel 6 and pivoted at their lower extremities to the axle 7, while their upper extremities are bent outwardly at right angles as shown at 15 and provided with perforations, through which rods 16 pass. The members 9 and 10 of each of the frames are connected by rods 16, secured at their opposite extremities to the said members 9 and 10, as shown at 17. As more clearly shown in Fig. 2, each of the uprights 14 has a cylinder 18 secured thereto by means of rivets 19, passed through the said uprights and an extension 20 formed on the lower extremity of said cylinders. The lower extremities of the said cylinders are also perforated for the passage of the rods 16 therethrough. In these cylinders 18, I arrange spiral springs 21, surrounding the rods 16, the upper extremities of the said springs being engaged by collars 22 formed on the rods 16, while the lower extremities of the cylinders 18 form stops for the springs.

From the foregoing description, it will be understood that the cylinders 18 are held stationary, while the rods 16 are permitted to slide in the said cylinders against the tension of the springs 21. The two frames are supported entirely by the springs 21, therefore these springs absorb or take up the concussions and jars incident to the traveling of the motor-cycle over rough ground. I arrange equalizing springs 23 in the said cylinders above the collars 22 of the rods 16. These equalizing springs surround the rods 16 and engage the upper surface of the collars 22, the upper ends of the cylinders 18 forming stops for the said equalizing springs.

As more clearly shown in Fig. 1, the members 10 of the frames are curved forwardly and connect with the members 8 of the said frames. Each of the said members 10 is provided with a forwardly located depending part 24, bent at right angles as shown at 25 and forming a foot rest for the occupant of the seat.

As previously explained, the uprights 14 are pivoted to the axle 7, therefore the seat may be swung forwardly or rearwardly on the said pivot and the desired angle of the seat 13 with respect to the horizontal position may be readily effected. On opposite sides of the rear wheel 6, I secure a quadrant 26, to any suitable part of the motor-cycle frame. In the drawing these quadrants are shown secured to the rear fork of the machine. The said quadrants 26 are provided with suitably spaced perforations 28, through which set screws 29' may be passed and enter the uprights 14, for holding the seat 13 in the desired position of adjustment with respect to the horizontal position.

The seat 13 is provided with a back 28, which consists of arms 29 and 30, connected at their upper extremities by means of a transverse cushion member 31. The members 10 are provided at their upper extremities with angle brackets 32. These angle brackets are perforated and the arms 29 and 30 pass through the said perforations, whereby the said back 28 is secured to the seat. Springs 34 and 35 are secured to the lower member 36 of the said angle brackets and engage the arms 29 and 30 in recesses 37, when the back is in the inoperative or lowered position, whereby the said back is firmly held against displacement from the inoperative position. The arms 29 and 30 are slidably mounted in the said brackets, whereby the back may be adjusted to any desired height to suit the convenience and comfort of the rider. The springs 34 and 35 engaging the arms 29 and 30, will hold the said back in the desired position. When the back has been raised to its limit of upward adjustment, the springs 34 and 35 will engage recesses 37' formed in the said arms 29 and 30 and will firmly hold the back against displacement. When the said back 28 is in the inoperative or lowered position, the lower extremities of the arms 29 and 30 will be received by brackets 38, formed on the members 10 below the brackets 32 and will thus hold the said arms firmly and against vibration or movement. Thus it may readily be seen that the back may be dispensed with when it is desired and the seat used without the back, enabling ladies to ride sidewise on the seat.

Attention is here called to the fact that the upper extremities of the springs 34 and 35 are curved, whereby the arms may be readily moved up and down between the said springs. These curved portions of the said springs also fit into the recesses 37 and 37', making it practicably impossible for the arms 29 and 30 to be accidentally displaced when the springs are engaging the said arms in the said recesses.

I have described my invention in its application to a motor-cycle, but I wish it understood that the same be applied to any two wheel vehicle with equal advantage.

The general design of my invention embodies many features of great importance and essential to a thoroughly practicable and efficient device of this character. These features, at first observation may seem to involve comparatively little difference from other devices, but when their functions and advantages over other devices are taken into consideration it becomes apparent that my invention is a great improvement over known devices for the same purpose.

While I have described and illustrated herein a specific form of my invention, it is understood that the same may be modified and varied without departing from the spirit of my invention or the domain of the appended claims.

Having thus described my invention, what I claim as new and desire to secure by Letters Patent is;—

1. A combined seat and luggage carrier for vehicles, comprising a frame member arranged on each side of one wheel of the vehicle, an upright pivoted to the vehicle on each side of said wheel, cylinders secured to said uprights, springs arranged in said cylinders, an approximately vertically disposed rod secured to each of said frame members, said rods being secured to said frame members at both extremities and passing through said cylinders, means carried by said rods and engaged by said springs for supporting said frame members, and sector shaped members secured to the vehicle and connected in adjustable relation with said uprights to hold said uprights against movement on their pivots.

2. A vehicle seat, comprising a frame member adapted to be arranged on each side of one of the wheels of the vehicle, an upright secured to the axle of said wheel on each side of the latter, a cylinder carried by each of said uprights, springs arranged in said cylinders, rods passing through the cylinders and secured, at both their upper and lower extremities, to the respective frame members, and pistons on the rods within the cylinders and engaging the springs.

3. A vehicle seat, comprising frame members, uprights secured to the vehicle, cylinders secured to said uprights, springs arranged in said cylinders, a seat proper carried by said frame members, rods passing through the cylinders and secured, at both their upper and lower extremities, to the respective frame members, and parts on the rods within the cylinders and engaging the springs.

4. A motor-cycle seat, comprising frame members respectively arranged on each side of one of the motor-cycle wheels, uprights respectively arranged on each side of said wheel and secured to the motor-cycle, a cylinder secured to each of said uprights, rods passing through the cylinders and secured, at both their upper and lower extremities, to the respective frame members, means on said rods within the cylinders and engaging the said springs, and a seat proper mounted upon said frame members.

In testimony whereof I affix my signature in the presence of two witnesses.

FRANK M. STOLL.

Witnesses:
FELIX THIES,
JNO. G. POWELL.

Copies of this patent may be obtained for five cents each, by addressing the "Commissioner of Patents, Washington, D. C."